United States Patent
Lee et al.

(10) Patent No.: US 10,805,639 B2
(45) Date of Patent: Oct. 13, 2020

(54) METHOD FOR DERIVING A TEMPORAL PREDICTIVE MOTION VECTOR, AND APPARATUS USING THE METHOD

(71) Applicant: KT CORPORATION, Gyeonggi-do (KR)

(72) Inventors: Bae Keun Lee, Gyeonggi-do (KR); Jae Cheol Kwon, Daejeon (KR); Joo Young Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/682,473

(22) Filed: Nov. 13, 2019

(65) Prior Publication Data
US 2020/0084475 A1    Mar. 12, 2020

Related U.S. Application Data

(63) Continuation of application No. 14/002,444, filed as application No. PCT/KR2012/007174 on Sep. 6, 2012, now Pat. No. 10,523,967.

(30) Foreign Application Priority Data

Sep. 9, 2011 (KR) .................. 10-2011-0091782
Apr. 17, 2012 (KR) .................. 10-2012-0039501

(51) Int. Cl.
*H04N 19/61* (2014.01)
*H04N 19/44* (2014.01)
(Continued)

(52) U.S. Cl.
CPC ........... *H04N 19/61* (2014.11); *H04N 19/105* (2014.11); *H04N 19/136* (2014.11);
(Continued)

(58) Field of Classification Search
None
See application file for complete search history.

(56) References Cited

U.S. PATENT DOCUMENTS

| | | |
|---|---|---|
| 5,508,744 A | 4/1996 | Savatier |
| 5,960,119 A | 9/1999 | Echigo et al. |

(Continued)

FOREIGN PATENT DOCUMENTS

| | | |
|---|---|---|
| CN | 1095878 A | 11/1994 |
| CN | 1656514 A | 8/2005 |

(Continued)

OTHER PUBLICATIONS

J. Jung and G. Clare, "Temporal MV predictor modification for MV-Comp, Skip, Direct and Merge schemes", Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D164, pp. 1-5.

(Continued)

*Primary Examiner* — Frederick D Bailey
(74) *Attorney, Agent, or Firm* — IP Legal Services, LLC

(57) ABSTRACT

Disclosed are a method for deriving a temporal predictive motion vector, and an apparatus using the method. An image decoding method may comprise the steps of: determining whether or not a block to be predicted is brought into contact with a boundary of a largest coding unit (LCU); and determining whether or not a first call block is available according to whether or not the block to be predicted is brought into contact with the boundary of the LCU. Accordingly, unnecessary memory bandwidth may be reduced, and implementation complexity may also be reduced.

5 Claims, 10 Drawing Sheets

(51) Int. Cl.
*H04N 19/167* (2014.01)
*H04N 19/136* (2014.01)
*H04N 19/52* (2014.01)
*H04N 19/105* (2014.01)

(52) U.S. Cl.
CPC ........... *H04N 19/167* (2014.11); *H04N 19/44* (2014.11); *H04N 19/52* (2014.11)

(56) References Cited

U.S. PATENT DOCUMENTS

| | | |
|---|---|---|
| 7,978,919 B2 | 7/2011 | Zhang |
| 8,457,198 B2 | 6/2013 | Baik |
| 8,532,185 B2 | 9/2013 | Jung et al. |
| 8,634,465 B2 | 1/2014 | Jung et al. |
| 8,644,385 B2 | 2/2014 | Jung et al. |
| 8,817,877 B2 | 8/2014 | Jung et al. |
| 8,824,551 B2 | 9/2014 | Jung et al. |
| 8,831,097 B2 | 9/2014 | Jung et al. |
| 8,831,098 B2 | 9/2014 | Jung et al. |
| 8,908,765 B2 | 12/2014 | Panusopone et al. |
| 9,036,692 B2 | 5/2015 | Tsai et al. |
| 2003/0099294 A1 | 5/2003 | Wang et al. |
| 2003/0123547 A1 | 7/2003 | Song |
| 2004/0013308 A1 | 1/2004 | Jeon et al. |
| 2004/0042552 A1 | 3/2004 | Dvorkovich et al. |
| 2004/0252230 A1 | 12/2004 | Winder |
| 2004/0258154 A1 | 12/2004 | Liu et al. |
| 2005/0013365 A1 | 1/2005 | Mukerjee et al. |
| 2005/0053147 A1 | 3/2005 | Mukerjee et al. |
| 2005/0117640 A1 | 6/2005 | Han |
| 2005/0117647 A1 | 6/2005 | Han |
| 2006/0067400 A1 | 3/2006 | Zhang |
| 2006/0133486 A1 | 6/2006 | Boyce |
| 2006/0133492 A1 | 6/2006 | Boyce |
| 2006/0215762 A1 | 9/2006 | Han et al. |
| 2006/0262981 A1 | 11/2006 | Jeon et al. |
| 2006/0268982 A1 | 11/2006 | Lee et al. |
| 2006/0294113 A1 | 12/2006 | Turaga et al. |
| 2007/0002946 A1 | 1/2007 | Bouton et al. |
| 2007/0014359 A1 | 1/2007 | Gomila et al. |
| 2007/0086518 A1 | 4/2007 | Jeon et al. |
| 2007/0154103 A1 | 7/2007 | Au et al. |
| 2007/0286281 A1 | 12/2007 | Tsuchiya et al. |
| 2008/0037636 A1 | 2/2008 | Jeon et al. |
| 2008/0037645 A1 | 2/2008 | Jeon et al. |
| 2008/0037646 A1 | 2/2008 | Jeon et al. |
| 2008/0037885 A1 | 2/2008 | Jeon et al. |
| 2008/0037886 A1 | 2/2008 | Jeon et al. |
| 2008/0043849 A1 | 2/2008 | Jeon et al. |
| 2008/0044093 A1 | 2/2008 | Jeon et al. |
| 2008/0044094 A1 | 2/2008 | Jeon et al. |
| 2008/0063071 A1 | 3/2008 | Suzuki |
| 2008/0101474 A1 | 5/2008 | Chiu et al. |
| 2008/0192827 A1 | 8/2008 | Beric et al. |
| 2009/0060050 A1 | 3/2009 | Park et al. |
| 2009/0067502 A1 | 3/2009 | Jeon et al. |
| 2009/0116558 A1 | 5/2009 | Chen et al. |
| 2009/0129472 A1 | 5/2009 | Panusopone et al. |
| 2009/0190037 A1 | 7/2009 | Chang et al. |
| 2009/0279608 A1 | 11/2009 | Jeon et al. |
| 2009/0296811 A1 | 12/2009 | Jeon et al. |
| 2010/0002771 A1 | 1/2010 | Huang et al. |
| 2010/0020870 A1 | 1/2010 | Jeon et al. |
| 2010/0026882 A1 | 2/2010 | Jeon et al. |
| 2010/0026883 A1 | 2/2010 | Jeon et al. |
| 2010/0026884 A1 | 2/2010 | Jeon et al. |
| 2010/0027653 A1 | 2/2010 | Jeon et al. |
| 2010/0027654 A1 | 2/2010 | Jeon et al. |
| 2010/0027659 A1 | 2/2010 | Jeon et al. |
| 2010/0027660 A1 | 2/2010 | Jeon et al. |
| 2010/0027682 A1 | 2/2010 | Jeon et al. |
| 2010/0046619 A1 | 2/2010 | Koo et al. |
| 2010/0074334 A1 | 3/2010 | Jeon et al. |
| 2010/0080293 A1 | 4/2010 | Jeon et al. |
| 2010/0086036 A1 | 4/2010 | Jeon et al. |
| 2010/0086051 A1 | 4/2010 | Park et al. |
| 2010/0086052 A1 | 4/2010 | Park et al. |
| 2010/0091843 A1 | 4/2010 | Jeon et al. |
| 2010/0091844 A1 | 4/2010 | Jeon et al. |
| 2010/0091845 A1 | 4/2010 | Jeon et al. |
| 2010/0091883 A1 | 4/2010 | Jeon et al. |
| 2010/0091884 A1 | 4/2010 | Jeon et al. |
| 2010/0091885 A1 | 4/2010 | Jeon et al. |
| 2010/0091886 A1 | 4/2010 | Jeon et al. |
| 2010/0104012 A1 | 4/2010 | Koo et al. |
| 2010/0104014 A1 | 4/2010 | Koo et al. |
| 2010/0111169 A1 | 5/2010 | Jeon et al. |
| 2010/0111170 A1 | 5/2010 | Koo et al. |
| 2010/0111171 A1 | 5/2010 | Koo et al. |
| 2010/0111172 A1 | 5/2010 | Koo et al. |
| 2010/0111173 A1 | 5/2010 | Koo et al. |
| 2010/0111174 A1 | 5/2010 | Koo et al. |
| 2010/0111183 A1 | 5/2010 | Jeon et al. |
| 2010/0128787 A1 | 5/2010 | Jeon et al. |
| 2010/0142615 A1 | 6/2010 | Han |
| 2010/0150234 A1 | 6/2010 | Koo et al. |
| 2010/0150235 A1 | 6/2010 | Koo et al. |
| 2010/0150236 A1 | 6/2010 | Koo et al. |
| 2010/0158112 A1 | 6/2010 | Koo et al. |
| 2010/0158113 A1 | 6/2010 | Koo et al. |
| 2010/0158114 A1 | 6/2010 | Koo et al. |
| 2010/0158117 A1 | 6/2010 | Koo et al. |
| 2010/0158118 A1 | 6/2010 | Koo et al. |
| 2010/0177824 A1 | 7/2010 | Koo et al. |
| 2010/0202519 A1 | 8/2010 | Koo et al. |
| 2010/0202521 A1 | 8/2010 | Koo et al. |
| 2010/0215100 A1 | 8/2010 | Jeon et al. |
| 2010/0220790 A1 | 9/2010 | Jeon et al. |
| 2010/0260265 A1 | 10/2010 | Jeon et al. |
| 2010/0266042 A1 | 10/2010 | Koo et al. |
| 2010/0316135 A1 | 12/2010 | Jeon et al. |
| 2010/0316136 A1 | 12/2010 | Jeon et al. |
| 2010/0316360 A1 | 12/2010 | Jeon et al. |
| 2010/0316361 A1 | 12/2010 | Jeon et al. |
| 2010/0316362 A1 | 12/2010 | Jeon et al. |
| 2011/0038412 A1 | 2/2011 | Jung et al. |
| 2011/0075736 A1 | 3/2011 | Endo |
| 2011/0103485 A1 | 5/2011 | Sato et al. |
| 2011/0129016 A1 | 6/2011 | Sekiguchi et al. |
| 2011/0170602 A1 | 7/2011 | Lee et al. |
| 2011/0176612 A1 | 7/2011 | Tsai et al. |
| 2011/0176613 A1 | 7/2011 | Tsai et al. |
| 2011/0188572 A1 | 8/2011 | Min et al. |
| 2012/0008688 A1 | 1/2012 | Tsai et al. |
| 2012/0063512 A1 | 3/2012 | Han et al. |
| 2012/0106645 A1 | 5/2012 | Lin et al. |
| 2012/0128060 A1 | 5/2012 | Lin et al. |
| 2012/0134415 A1 | 5/2012 | Lin et al. |
| 2012/0134416 A1 | 5/2012 | Lin et al. |
| 2012/0147955 A1 | 6/2012 | Budagavi |
| 2012/0195368 A1 | 6/2012 | Chien et al. |
| 2012/0263229 A1 | 10/2012 | Lim et al. |
| 2012/0263231 A1 | 10/2012 | Zhou |
| 2012/0263235 A1 | 10/2012 | Sugio et al. |
| 2012/0275512 A1 | 11/2012 | Bouton et al. |
| 2012/0300850 A1 | 11/2012 | Yie et al. |
| 2012/0301040 A1 | 11/2012 | Yie et al. |
| 2013/0005493 A1 | 1/2013 | Kim |
| 2013/0022115 A1 | 1/2013 | Oh |
| 2013/0107959 A1 | 5/2013 | Park et al. |
| 2013/0128967 A1 | 5/2013 | Yu et al. |
| 2013/0128969 A1 | 5/2013 | Yu et al. |
| 2013/0128970 A1 | 5/2013 | Yu et al. |
| 2013/0128977 A1 | 5/2013 | Yu et al. |
| 2013/0156108 A1 | 6/2013 | Jeon et al. |
| 2013/0156335 A1 | 6/2013 | Lim et al. |
| 2013/0163672 A1 | 6/2013 | Jeon et al. |
| 2013/0188721 A1 | 7/2013 | Jeon et al. |
| 2013/0188722 A1 | 7/2013 | Jeon et al. |
| 2013/0195192 A1 | 8/2013 | Jeon et al. |
| 2013/0202034 A1 | 8/2013 | Yu et al. |
| 2013/0202045 A1 | 8/2013 | Jeon et al. |
| 2013/0202046 A1 | 8/2013 | Jeon et al. |

(56) References Cited

U.S. PATENT DOCUMENTS

| | | |
|---|---|---|
| 2013/0208800 A1 | 8/2013 | Jeon et al. |
| 2013/0208993 A1 | 8/2013 | Jeon et al. |
| 2013/0242046 A1 | 9/2013 | Zhang et al. |
| 2013/0243081 A1 | 9/2013 | Chen et al. |
| 2013/0243088 A1 | 9/2013 | Lim et al. |
| 2013/0243093 A1 | 9/2013 | Chen et al. |
| 2013/0265388 A1 | 10/2013 | Zhang et al. |
| 2013/0266071 A1 | 10/2013 | Jeon et al. |
| 2013/0272375 A1 | 10/2013 | Yu et al. |
| 2013/0272406 A1 | 10/2013 | Yu et al. |
| 2013/0272416 A1 | 10/2013 | Jeon et al. |
| 2013/0272417 A1 | 10/2013 | Jeon et al. |
| 2013/0272418 A1 | 10/2013 | Jeon et al. |
| 2013/0301735 A1 | 11/2013 | Sugio et al. |
| 2014/0010283 A1 | 1/2014 | Lim et al. |
| 2014/0016701 A1 | 1/2014 | Chen et al. |
| 2014/0105297 A1 | 4/2014 | Jeon et al. |
| 2014/0146880 A1 | 5/2014 | Jung et al. |
| 2014/0198848 A1 | 7/2014 | Yie et al. |
| 2014/0294101 A1 | 10/2014 | Min et al. |
| 2014/0334535 A1 | 11/2014 | Jung et al. |
| 2015/0030077 A1 | 1/2015 | Jeon et al. |
| 2015/0030078 A1 | 1/2015 | Jeon et al. |
| 2015/0030079 A1 | 1/2015 | Jeon et al. |
| 2015/0030080 A1 | 1/2015 | Jeon et al. |
| 2015/0036749 A1 | 2/2015 | Jeon et al. |
| 2015/0043631 A1 | 2/2015 | Yie et al. |
| 2015/0043632 A1 | 2/2015 | Yie et al. |
| 2015/0043640 A1 | 2/2015 | Yie et al. |
| 2015/0043643 A1 | 2/2015 | Yie et al. |
| 2015/0131723 A1 | 5/2015 | Min et al. |
| 2015/0139315 A1 | 5/2015 | Min et al. |
| 2015/0146783 A1 | 5/2015 | Sugio et al. |
| 2015/0163494 A1 | 6/2015 | Park et al. |
| 2015/0189320 A1 | 7/2015 | Min et al. |
| 2015/0208093 A1 | 7/2015 | Lee et al. |
| 2015/0222922 A1 | 8/2015 | Tsai et al. |
| 2015/0326876 A1 | 11/2015 | Tsai et al. |
| 2016/0249054 A1 | 8/2016 | Park et al. |
| 2016/0337660 A1 | 11/2016 | Sugio et al. |
| 2018/0070103 A1 | 3/2018 | Jeon et al. |
| 2018/0103264 A1 | 4/2018 | Sugio et al. |
| 2018/0227582 A1 | 8/2018 | Park et al. |
| 2018/0234678 A1 | 8/2018 | Lim et al. |
| 2019/0124336 A1 | 4/2019 | Park et al. |
| 2019/0246139 A1 | 8/2019 | Jeon et al. |

FOREIGN PATENT DOCUMENTS

| | | |
|---|---|---|
| CN | 1756361 A | 4/2006 |
| CN | 1839632 A | 9/2006 |
| CN | 101090491 A | 12/2007 |
| CN | 101102503 A | 1/2008 |
| CN | 101119493 A | 2/2008 |
| CN | 101156451 A | 4/2008 |
| CN | 101204094 A | 6/2008 |
| CN | 101222638 A | 7/2008 |
| CN | 101253777 A | 8/2008 |
| CN | 100474930 C | 4/2009 |
| CN | 101449585 A | 6/2009 |
| CN | 101494780 A | 7/2009 |
| CN | 101540926 A | 9/2009 |
| CN | 101690220 A | 3/2010 |
| CN | 101860754 A | 10/2010 |
| CN | 101884219 A | 11/2010 |
| CN | 101889405 A | 11/2010 |
| CN | 101931803 A | 12/2010 |
| CN | 101999228 A | 3/2011 |
| CN | 102131094 A | 7/2011 |
| EP | 2515538 A2 | 10/2012 |
| EP | 2781098 A1 | 9/2014 |
| EP | 2783510 A1 | 10/2014 |
| EP | 2810439 A1 | 12/2014 |
| EP | 2826244 A1 | 1/2015 |
| EP | 2826246 A1 | 1/2015 |
| EP | 2826247 A1 | 1/2015 |
| EP | 2826248 A1 | 1/2015 |
| EP | 2837190 A1 | 2/2015 |
| EP | 2870767 A2 | 5/2015 |
| EP | 3136727 A1 | 3/2017 |
| JP | 09-084052 A | 3/1997 |
| JP | 2005-244503 A | 9/2005 |
| JP | 2006-303734 A | 11/2006 |
| JP | 2010-011075 A | 1/2010 |
| JP | 2011-151775 A | 8/2011 |
| JP | 5745693 B2 | 7/2015 |
| JP | 6062480 B2 | 1/2017 |
| KR | 10-0446083 B1 | 8/2004 |
| KR | 10-2006-0028848 A | 4/2006 |
| KR | 10-2006-0123939 A | 12/2006 |
| KR | 10-2011-0017783 A | 2/2011 |
| KR | 10-1033243 B1 | 5/2011 |
| KR | 10-2011-0068897 A | 6/2011 |
| KR | 10-2011-0090781 A | 8/2011 |
| RU | 2003174 C1 | 11/1993 |
| RU | 2182727 C2 | 5/2002 |
| RU | 2329615 C2 | 7/2008 |
| RU | 2335860 C2 | 10/2008 |
| RU | 2341035 C1 | 12/2008 |
| RU | 2360375 C2 | 6/2009 |
| RU | 2409005 C2 | 1/2011 |
| WO | 2011/070730 A1 | 6/2011 |
| WO | 2011/074896 A2 | 6/2011 |
| WO | 2011/096741 A2 | 8/2011 |
| WO | 2011/096770 A2 | 8/2011 |
| WO | 2011/139099 A2 | 11/2011 |
| WO | 2012/006889 A1 | 1/2012 |
| WO | 2012/081949 A2 | 6/2012 |
| WO | 2012/102021 A1 | 8/2012 |
| WO | 2012/102927 A1 | 8/2012 |

OTHER PUBLICATIONS

Minhua Zhou et al., "A study on HM3.0 parsing throughput issue", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F068, pp. 1-17.

Minhua Zhou, "Parallelized merge/skip mode for HEVC", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F069, pp. 1-13.

Minhua Zhou et al., "CE9: Simplified AMVP design (SP06S1, SP06S2)", Joint Collaborative Team on Video Coding (JCT-VC) of ITU-T SG16 WP3 and ISO/IEC JTC1/SC29/WG11, 6th Meeting: Torino, IT, Jul. 2011, JCTVC-F086, pp. 1-12.

Yunfei Zheng et al., "Unified Motion Vector Predictor Selection for Merge and AMVP", Joint Collaborative Team on Video Coding (JCT-VC) of ITU-T SG16 WP3 and ISO/IEC JTC1/SC29/WG11, 5th Meeting: Geneva, Mar. 2011, JCTVC-E396, pp. 1-5.

U.S. Appl. No. 61/476,407, filed Apr. 18, 2011.

Toshiyasu Sugio et al., "Modified derivation process of temporal motion vector predictor", Document: JCTVC-D273, Joint Collaborative Team on Video Coding (JCT-VC) of ITU-T SG16 WP3 and ISO/IEC JTC1/SC29/WG11 4th Meeting: Daegu, KR, Jan. 20-28, 2011, pp. 1-4.

Edouard Francois et al., "On memory compression for motion vector prediction", Document: JCTVC-E221, Joint Collaborative Team on Video Coding (JCT-VC) of ITU-T SG16 WP3 and ISO/IEC JTC1/SC29/WG11 5th Meeting: Geneva, CH, Mar. 16-23, 2011, pp. 1-10.

JCT-VC, "Test Model under Consideration", Document: JCTVC-A205, Joint Collaborative Team on Video Coding (JCT-VC) of ITU-T SG16 WP3 and ISO/IEC JTC1/SC29/WG11 1st Meeting: Dresden, DE, Apr. 15-23, 2010.

JCT-VC, "Test Model under Consideration", Document: JCTVC-B205, Joint Collaborative Team on Video Coding (JCT-VC) of ITU-T SG16 WP3 and ISO/IEC JTC1/SC29/WG11 2nd Meeting: Geneva, CH, Jul. 21-28, 2010.

Feng Wu et al., "Direct Mode Coding for Bipredictive Slices in the H.264 Standard", IEEE Transactions on Circuits and Systems for Video Technology, Jan. 2005, pp. 119-126, vol. 15, No. 1.

(56) References Cited

OTHER PUBLICATIONS

Jian-Liang Lin et al., "Improved Advanced Motion Vector Prediction", Document: JCTVC-D125, Joint Collaborative Team on Video Coding (JCT-VC) of ITU-T SG 16 WP3 and ISO/IEC JTC1/SC29/WG11, 4th Meeting: Daegu, KR, Jan. 20-28, 2011, pp. 1-8.

Tim Hellman et al., "Limiting Collocated Temporal Reference to One Per Picture", Document: JCTVC-H0442, Joint Collaborative Team on Video Coding (JCT-VC) of ITU-T SG 16 WP3 and ISO/IEC JTC1/SC29/WG11, 5th Meeting: San Jose, CA, USA, Feb. 1-10, 2012, pp. 1-4.

Benjamin Bross et al., "WD5: Working Draft 5 of High-Efficiency Video Coding", Document: JCTVC-G1103_d9, Joint Collaborative Team on Video Coding (JCT-VC) of ITU-T SG 16 WP3 and ISO/IEC JTC1/SC29/WG11, 7th Meeting: Geneva, CH, Nov. 21-30, 2011, pp. 1-18.

Minhua Zhou, "Non-CE9: Modified H positions for memory bandwidth reduction in TMVP derivation", Document: JCTVC-G082, Joint Collaborative Team on Video Coding (JCT-VC) of ITU-T SG 16 WP3 and ISO/IEC JTC1/SC29/WG11, 7th Meeting: Geneva, CH, Nov. 19-30, 2011, pp. 1-12.

Minhua Zhou, "CE1: Evaluation results on A.09, A.13-16 and an alternative solution", Document: JCTVC-F081, Joint Collaborative Team on Video Coding (JCT-VC) of ITU-T SG 16 WP3 and ISO/IEC JTC1/SC29/WG11, 6th Meeting: Torino, IT, Jul. 14-22, 2011, pp. 1-6.

Il-Koo Kim et al., "Reduction of reference picture list checking for temporal motion vector prediction", Document: JCTVC-F587, Joint Collaborative Team on Video Coding (JCT-VC) of ITU-T SG 16 WP3 and ISO/IEC JTC1/SC29/WG11, 6th Meeting: Torino, IT, Jul. 14-22, 2011, pp. 1-10.

Thomas Wiegand et al., "WD3: Working Draft 3 of High-Efficiency Video Coding", Document: JCTVC-E603, Joint Collaborative Team on Video Coding (JCT-VC) of ITU-T SG 16 WP3 and ISO/IEC JTC1/SC29/WG11, 5th Meeting: Geneva, CH, Mar. 16-23, 2011, pp. 1-20.

Atsuro Ichigaya et al., "Description of video coding technology proposal by NHK and Mitsubishi", Document: JCTVC-A122, Joint Collaborative Team on Video Coding (JCT-VC) of ITU-T SG 16 WP3 and ISO/IEC JTC1/SC29/WG11, 1st Meeting: Dresden, DE, Apr. 15-23, 2010, pp. 1-22.

Ankur Saxena et al., "CE7: Mode-dependent DCT/DST for intra prediction in video coding", Document: JCTVC-D033, Joint Collaborative Team on Video Coding (JCT-VC) of ITU-T SG 16 WP3 and ISO/IEC JTC1/SC29/WG11, 4th Meeting: Daegu, KR, Jan. 20-28, 2011, pp. 1-7.

Alexis M. Tourapis et al., "Direct macroblock coding for predictive (P) pictures in the H.264 standard".

Alexis M. Tourapis et al., "Motion Vector Prediction with Reference Frame Consideration", Article in Proceedings of SPIE—The International Society of Optical Engineering, Nov. 2003.

Joel Jung et al., "Competition-Based Scheme for Motion Vector Selection and Coding", Document VCEG-AC06, ITU—Telecommunications Standardization Sector Study Group 16 Question 6, Video Coding Experts Group (VCEG) 29th Meeting: Klagenfurt, Austria, Jul. 17-18, 2006.

Takeshi Chujoh et al,, "Description of video coding technology proposal by Toshiba", Document: JCTVC-A117rl, Joint Collaborative Team on Video Coding (JCT-VC) of ITU-T SG16 WP3 and ISO/IEC JTC1/SC29/WG11, 1st Meeting: Dresden, DE, Apr. 15-23, 2010.

K. R. Rao et al., "High effiency video coding and other emerging standards", 2017.

Thomas Wiegand et al., "WD3: Working Draft 3 of High-Efficiency Video Coding", Document: JCTVC-E603, Joint Collaborative Team on Video Coding (JCT-VC) of ITU-T SG16 WP3 and ISO/IEC JTC1/SC29/WG11, 5th Meeting: Geneva, CH, Mar. 16-23, 2011.

B. Bross et al., "BoG report of CE9: MV Coding and Skip/Merge operations", Document: JCTVC-E481, JJoint Collaborative Team on Video Coding (JCT-VC) of ITU-T SG16 WP3 and ISO/IEC JTC1/SC29/WG11 5th Meeting: Geneva, CH, Mar. 16-23, 2011, pp. 1-20.

Benjamin Bross et al., "WD4: Working Draft 4 of High-Efficiency Video Coding", Document: JCTVC-F803_d4, Joint Collaborative Team on Video Coding (JCT-VC) of ITU-T SG16 WP3 and ISO/IEC JTC1/SC29/WG11, 6th Meeting: Torino, IT, Jul. 14-22, 2011, pp. 1-230.

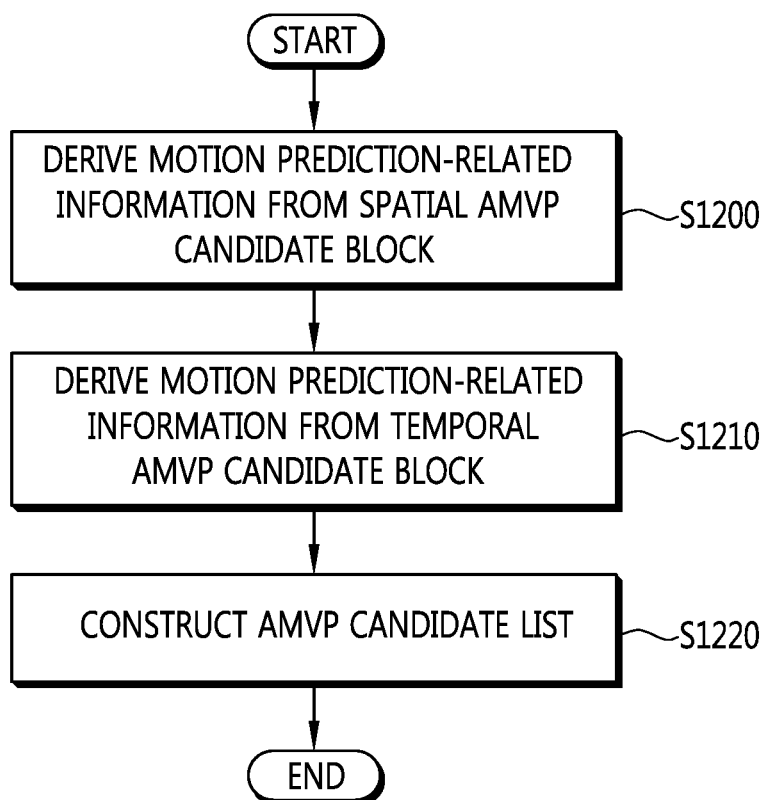

METHOD FOR DERIVING A TEMPORAL PREDICTIVE MOTION VECTOR, AND APPARATUS USING THE METHOD

CROSS REFERENCE TO RELATED APPLICATIONS

This application is a Continuation of U.S. patent application Ser. No. 14/002,444 (filed on Aug. 30, 2013), which is a National Stage patent application of PCT International Patent Application No. PCT/KR2012/007174 (filed on Sep. 6, 2012) under 35 U.S.C. § 371, which claims priority to Korean Patent Application Nos. 10-2011-0091782 (filed on Sep. 9, 2011) and 10-2012-0039501 (filed on Apr. 17, 2012), the teachings of which are incorporated herein in their entireties by reference.

TECHNICAL FIELD

The present invention relates to a video encoding and decoding method, and more specifically, the present invention pertains to a method for deriving a temporal prediction motion vector and an apparatus for using this method.

BACKGROUND ART

In recent years, a demand for high-resolution, high-quality video, such as HD (High Definition) video and UHD (Ultra High Definition) video, has been increased in various areas. As video data comes to have high resolution and/or high quality, an amount of video data relatively goes up compared with existing video data, and thus, when the video data is transmitted via a conventional wired/wireless broadband network or is stored in an existing storage medium, costs for transmission and storage are increased. To address such problems that occur as video data goes to high resolution and high quality, high-efficiency video compression technologies may be utilized.

A number of scheme have been introduced for a video compression, such as inter prediction scheme that predicts pixel values included in a current picture from a picture before or after the current picture, intra prediction scheme that predicts pixel values included in a current picture using pixel information in the current picture, and entropy encoding scheme that assigns a shorter codeword to a value that happens more frequently while assigning a longer codeword to a value that happens less frequently. Such video compression schemes may be utilized to effectively compress, transmit, or store video data.

SUMMARY OF INVENTION

Technical Problem

An object of the present invention is to provide a method of deriving a temporal prediction motion vector for a block adjoining with an LCU boundary.

Another object of the present invention is to provide an apparatus of performing a method of deriving a temporal prediction motion vector for a block adjoining with an LCU boundary.

Technical Solution

To achieve the first object of the present invention, according to an aspect of the present invention, a video decoding method includes the steps of determining a reference picture index of a collocated block of a prediction target block; and determining a motion prediction vector of the collocated block, the collocated block is a block adaptively determined by a location of the prediction target block within a Largest Coding Unit (LCU). The collocated block may be determined by deciding whether a lower boundary of the prediction target block adjoins with an LCU boundary. The collocated block may be determined by deciding whether a lower boundary of the prediction target block adjoins with an LCU boundary and whether only a right boundary of the prediction target block adjoins with the LCU boundary. The collocated block may be determined by referencing positions of pixels within the LCU. If a left side or lower boundary of the prediction target block does not adjoin with the LCU boundary, a first collocated block and a fifth collocated block are sequentially determined as the collocated block according to an availability of the collocated block at a corresponding position.

To achieve the second object of the present invention, according to an aspect of the present invention, a video decoding method may include the steps of determining whether a boundary of a prediction target block adjoins with a boundary of a LCU; and determining an availability of a first collocated block according to the determination of whether the boundary of the prediction target block adjoins with the boundary of the LCU. The video decoding method may further include the step of determining other collocated block except for the first collocated block as a collocated block to derive a temporal prediction motion vector if it is determined that the first collocated block is not available. The step of determining the other collocated block except for the first collocated block as the collocated block to derive the temporal prediction motion vector if the first collocated block is not available, is a step for determining different collocated blocks to derive the temporal prediction motion vector for a case where a lower boundary of the prediction target block adjoins with the boundary of the LCU and for a case where only a right boundary of the prediction target block adjoins with the boundary of the LCU. The step of determining the availability of the first collocated block according to the determination of whether the boundary of the prediction target block is adjoined with the boundary of the LCU, is a step for determining the first collocated block as unavailable if a lower boundary of the prediction target block adjoins with the boundary of the LCU. The step of determining the first collocated block as the collocated block to derive the temporal prediction motion vector if the first collocated block is available, or determining an availability of a fifth collocated block if the first collocated block is not available, may be further comprised.

To achieve the third object of the present invention, according to an aspect of the present invention, a video decoding apparatus includes an entropy decoding unit that decodes LCU size information and a prediction unit that determines a reference picture index of a collocated block of a prediction target block and determines a motion prediction vector of the collocated block, wherein the collocated block is a block adaptively determined by a location of the prediction target block within an LCU. The collocated block may be determined by deciding whether a lower boundary of the prediction target block adjoins with an LCU boundary. The collocated block may be determined by deciding whether a lower boundary of the prediction target block adjoins with an LCU boundary and whether only a right boundary of the prediction target block adjoins with the LCU boundary. The collocated block may be determined by referencing positions of pixels within the LCU. If a left side or lower boundary of the prediction target block is not adjoined with the LCU boundary, a first collocated block and a fifth collocated block are sequentially determined as the collocated block according to an availability of the collocated block at a corresponding position.

To achieve the fourth object of the present invention, according to an aspect of the present invention, a video decoding unit may include an entropy decoding unit that decodes LCU size information and a prediction unit that determines whether a boundary of a prediction target block adjoins with a boundary of an LCU and determines an availability of a first collocated block according to the determination of whether the boundary of the prediction target block adjoins with the boundary of the LCU. The prediction unit may determine other collocated block except for the first collocated block as a collocated block to derive a temporal prediction motion vector if it is determined that the first collocated block is not available. The prediction unit may determine different collocated blocks to derive the temporal prediction motion vector for a case where a lower boundary of the prediction target block adjoins with the boundary of the LCU and for a case where only a right boundary of the prediction target block adjoins with the boundary of the LCU. The prediction unit may determine the first collocated block as unavailable if a lower boundary of the prediction target block adjoins with the boundary of the LCU. The prediction unit may determine the first collocated block as the collocated block to derive the temporal prediction motion vector if the first collocated block is available, or may determine an availability of a fifth collocated block if the first collocated block is not available.

Advantageous Effects

As described above, the method of deriving a temporal prediction motion vector and an apparatus of using the method according to an embodiment of the present invention may differently use a collocated (or co-located or colocated) picture, from which a temporal motion vector derived, depending on whether a prediction target block adjoins an LCU. By using this method, the bandwidth of memory unnecessarily used to derive a temporal motion vector may be reduced and complexity in implementation may be minimized.

DESCRIPTION OF DRAWINGS

FIG. 10 is a flowchart illustrating an inter prediction method using AMVP according to an embodiment of the present invention.

MODE FOR INVENTION

Figure 1:
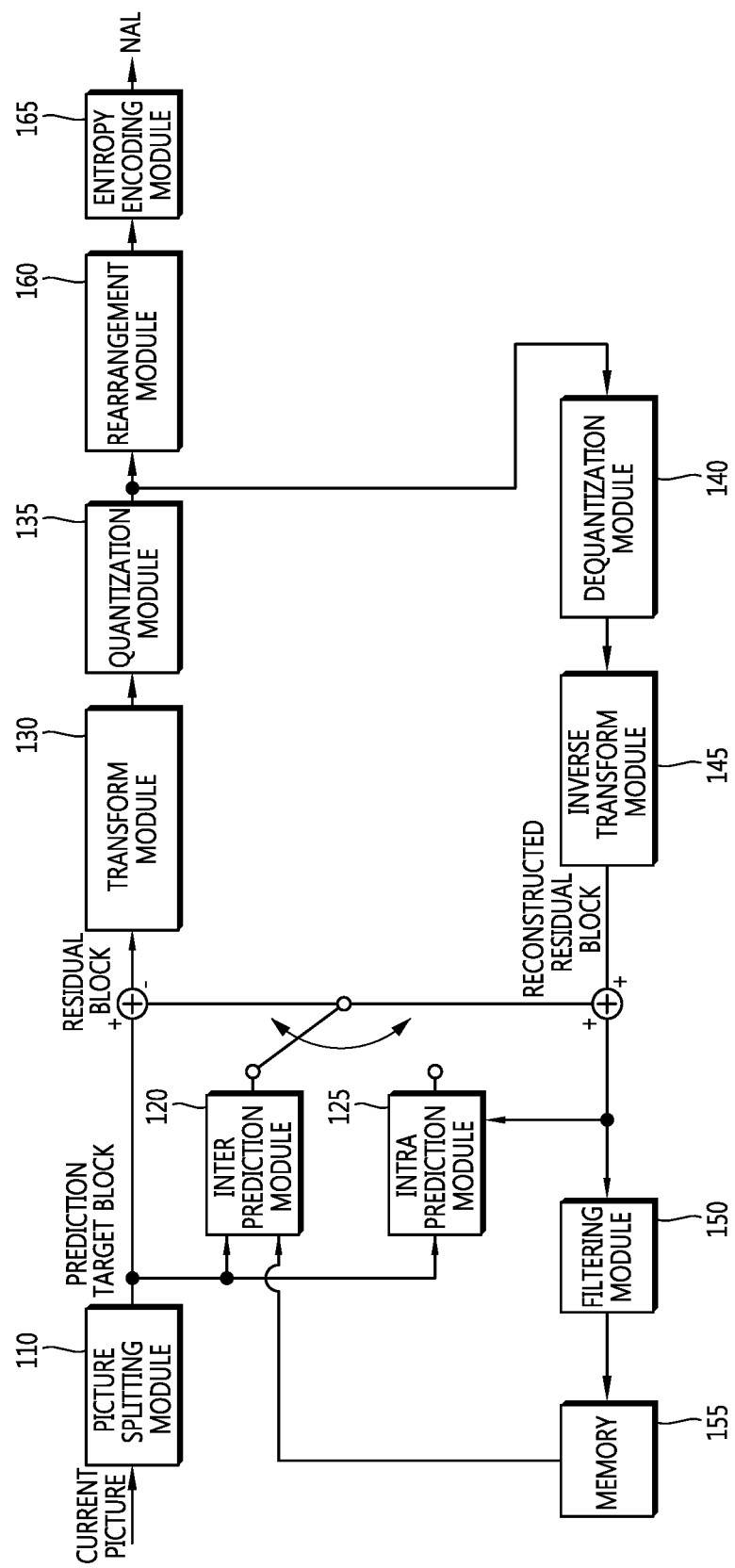
FIG. 1 is a block diagram illustrating a video encoding apparatus according to an embodiment of the present invention.

Various modifications may be made to the present invention and the present invention may have a number of embodiments. Specific embodiments are described in detail with reference to the figures. However, the present invention is not limited to specific embodiments, and it should be understood that the present invention includes all modifications, equivalents, or replacements that are included in the spirit and technical scope of the present invention. Similar referencing marks may be used for between similar modules when the figures are explained.

The terms "first" and "second" may be used to describe various components (or feature). However the components are not limited thereto. These terms are used only to distinguish one component from another. For example, the first component may be also named as the second component, and the second component may be similarly named as the first component. The term "and/or" includes a combination of a plurality of related items as described herein or any one of the plurality of related items.

When a component (or feature) is "connected" or "coupled" to another component, the component may be directly connected or coupled to the other component. In contrast, when a component is "directly connected or coupled" to another component, no component intervenes.

The terms used herein are given to describe the embodiments but not intended to limit the present invention. A singular term includes a plural term unless otherwise stated clearly in context. As used herein, the terms "include" or "have", etc. are used to indicate that there are features, numerals, steps, operations, components, parts or combinations thereof as described herein, but do not exclude the presence or possibility of addition of one or more features, numerals, steps, operations, components, parts or components thereof.

Hereinafter, preferred embodiments of the present invention will be described in greater detail with reference to the accompanying drawings. The same reference numerals refer to the same components throughout the drawings, and the description of the same components is not repeated.

FIG. 1 is a block diagram illustrating a video encoding apparatus according to an embodiment of the present invention.

Referring to FIG. 1, the video encoding apparatus 100 may include a picture splitting module 110, an inter prediction module 120, an intra prediction module 125, a transform module 130, a quantization module 135, a re-arrangement module 160, an entropy encoding module 165, a dequantization module 140, an inverse transform module 145, a filtering module 150, and a memory 155.

Each module of FIG. 1 are shown independently from each other to represent different functions from each other in the video encoding apparatus, but this does not mean that each module should be implemented in a separated hardware or software module (component) unit. That is, for convenience of description, the modules are shown to be provided independently, and at least two of the modules may be combined to constitute one module, or one of the modules may be divided into a plurality of modules to perform functions. Embodiments of combinations of the modules or embodiments of separation of the modules are also included in the scope of the present invention without departing from the gist of the present invention.

Further, some of the modules may be not essential modules that perform essential functions of the present invention but may be rather optional modules to enhance performance. The present invention may include only the essential modules necessary to implement the gist of the present invention excluding the modules merely used for better performance, and this structure is also included in the scope of the present invention.

A picture splitting module 110 may split an input picture into at least one processing unit. At this time, the processing unit may be a prediction unit (PU), a transform unit (TU), or a coding unit (CU). The picture splitting module 110 may encode the picture by splitting one picture into a combination of a plurality of coding units, prediction units, and transform units, and a combination of one coding unit, prediction unit and transform unit may be selected according to a predetermined standard (or reference) such as a cost function and may be encoded.

For example, one picture may be split into a plurality of coding units. A recursive tree structure, such as quad tree structure, may be used to split a picture into coding units. With a picture or a largest coding unit as a root, a coding unit may be split into other coding units as many child nodes as the number of the split coding units. The coding unit that is no more split due to a predetermined limitation is to be a leaf node. That is, assuming that only square-shape split is available for a coding unit, the coding unit may be split into a maximum of four other coding units.

Hereinafter, in embodiments of the present invention, the coding unit may mean a unit in which decoding as well as encoding is performed.

A prediction unit may be partitioned with a form of at least one square or rectangle having a same size within a coding unit.

Upon generation of a prediction unit in which intra prediction is performed based on a coding unit, if the coding unit is not a smallest coding unit, intra prediction may be performed without splitting the prediction unit into a plurality of N×N prediction units.

A prediction module may include an inter prediction module 120 that performs an inter prediction and an intra prediction module 125 that performs an intra prediction. It may be determined whether to perform the inter prediction or intra prediction with respect to the prediction unit, and according to each prediction method, specific information (e.g., intra prediction mode, motion vector, reference picture, etc.) may be determined. At this time, a processing unit on which prediction is performed may differ from a processing unit on which the prediction method and its details are determined. For example, the prediction method and prediction mode may be determined by a prediction unit, and a performance of the prediction may be performed in a transform unit. A residual value (residual block) between a generated prediction block and an original block may be input to the transform module 130. Further, the prediction mode information and motion vector information, etc. used for the prediction, together with the residual value, may be encoded in an entropy encoding module 165 and may be then transmitted to a decoding apparatus. If a specific encoding mode is used, rather than generating the prediction block by the prediction module 120 and 125, the original block, as is, may be encoded and transmitted to the decoding apparatus.

The inter prediction module may predict a prediction unit based on information of at least one picture among pictures prior to a current picture or pictures after the current picture. The inter prediction module may include a reference picture interpolation module, a motion prediction module, and a motion compensation module.

The reference picture interpolation module may receive reference picture information from the memory 155 and may generate pixel information in the unit of less than an integer pixel unit within the reference picture. In the case of luma pixels, a DCT-based 8 tap interpolation filter with different filter coefficients for each tap may be used to generate the pixel information in the unit of less than the integer pixel unit, a unit of ¼ pixel. In the case of a chroma signal, a DCT-based 4 tap interpolation filter with different filter coefficients for each tap may be used to generate the pixel information in the unit of less than the integer pixel unit, a unit of ⅛ pixel.

A motion prediction module may perform motion prediction based on a reference picture interpolated by the reference picture interpolation module. To derive a motion vector, various methods may be used, such as FBMA (Full search-based Block Matching Algorithm), TSS (Three Step Search), NTS (New Three-Step Search Algorithm), etc. The motion vector may have a motion vector value in a ½ pixel unit or in a ¼ pixel unit based on an interpolated pixel. The motion prediction module may predict a current prediction unit by applying various motion prediction method. As to the motion prediction method, various methods may be used, such as a skip method, a merge method, or an AMVP (Advanced Motion Vector Prediction) method.

According to an embodiment of the present invention, the inter prediction module may determine whether a boundary of a prediction target block adjoins with a boundary of an LCU (Largest Coding Unit), and may determine whether a first collocated (or colocated or co-located) block is available according to the determination of whether the boundary of the prediction target block adjoins with the boundary of the LCU. For example, in case the first collocated block is not available, a second collocated block may be determined as a collocated block to derive a temporal prediction motion vector. Or in case the first collocated block is not available, a position of the first collocated block may be changed, and the position-changed first collocated block may be determined as a collocated block to derive a temporal prediction motion vector.

Further, the inter prediction module may include a predicting module that determines a reference picture index of a collocated block of a prediction target block and determines a motion prediction vector of the collocated block. The collocated block may be adaptively determined according to a location of the prediction target block in the LCU (Largest Coding Unit). Hereinafter, the operation of the prediction module according to the present invention is described in detail.

The inter prediction module may generate a prediction unit based on information on a reference pixel neighboring to the current block, which is pixel information on pixels in the current picture. In case the block neighboring to the current prediction unit is a block that inter prediction is applied to, and thus, the reference pixel is a pixel through the inter prediction, the reference pixel included in the block to which the inter prediction applied may be replaced using reference pixel information of a block to which the intra prediction applied. That is, in case a reference pixel is not available, the unavailable reference pixel information may be replaced with at least one of available reference pixels.

As for the intra prediction, prediction modes may include a directional prediction mode in which reference pixel information is used according to a prediction direction and a non-directional mode in which, upon prediction, no directional information is used. A mode for predicting luma information may be different from a mode for predicting chroma information. Further, information on an intra prediction mode in which luma information has been predicted or predicted luma signal information may be utilized in order to predict chroma information.

Upon performing the intra prediction, if the size of a prediction unit is the same as the size of a transform unit, the intra prediction is performed based on pixels located at the left side of the prediction unit, a pixel located at a top left of the prediction unit, and pixels located at top on the prediction unit. However, upon performing intra prediction, if the size of the prediction unit is different from the size of the transform unit, the intra prediction may be performed by using reference pixels based on the transform unit. Further, for a smallest coding unit only, the intra prediction may be performed by using N×N partition.

In the intra prediction method, a prediction block may be generated after being applied with an MDIS (Mode Dependent Intra Smoothing) filter on reference pixels according to the prediction mode. Various types of MDIS filters may be applicable to the reference pixels. To perform the intra prediction method, an intra prediction mode of a current prediction unit may be predicted from an intra prediction mode of a neighboring prediction unit of the current prediction unit. In case the prediction mode of the current prediction unit is predicted using the mode information predicted from the neighboring prediction unit, if the intra prediction mode of the current prediction unit is the same as the intra prediction mode of the neighboring prediction unit, predetermined flag information may be used to transmit information indicating that the current prediction unit is identical in the prediction mode to the neighboring prediction unit. And if the prediction mode of the current prediction unit is different from the prediction mode of the neighboring prediction unit, an entropy encoding may be performed to encode the prediction mode information of the current block.

Further, a residual block may be derived, which includes information on a residual value that is a differential value between an original block of a prediction unit and a prediction unit on which prediction is performed based on the prediction unit generated in the prediction module 120 and 125. The derived residual block may be input to the transform module 130. The transform module 130 may transform the residual block by a transform method, such as DCT (Discrete Cosine Transform) or DST (Discrete Sine Transform). The residual block includes residual information between the prediction unit generated through the prediction module 120 and 125 and the original block. Whether to apply DCT or DST to transform the residual block may be determined based on intra prediction mode information of the prediction unit used for generating the residual block.

The quantization module 135 may quantize values transformed into a frequency domain by the transform module 130. A quantization parameter may vary depending on a block or importance of an image. A value produced from the quantization module 135 may be provided to the dequantization module 140 and the re-arrangement module 160.

The re-arrangement module 160 may perform re-arrangement of coefficients for the quantized residual value.

The re-arrangement module 160 may change 2-dimensional (2D) block shaped coefficients to one-dimensional vector form through a coefficient scanning method. For example, the re-arrangement module 160 may use a diagonal scanning method for scanning from DC coefficients to high-frequency coefficients, thereby arranging 2D block shaped coefficients into the form of a one-dimensional vector. Depending on the size of the transform unit and intra prediction mode, instead of the diagonal scanning method, a vertical scanning method in which 2D block shaped coefficients are scanned along a column direction or a horizontal scanning method in which 2D block shaped coefficients are scanned along a row direction may be used. In other words, one of the diagonal scanning, vertical scanning, and horizontal scanning may be used depending on the size of the transform unit and the intra prediction mode.

The entropy encoding module 165 may perform an entropy encoding based on values produced by the re-arrangement module 160. For the entropy encoding, various encoding methods, such as, e.g., Exponential Golomb, CABAC (Context-Adaptive Binary Arithmetic Coding), may be applied.

The entropy encoding module 165 may encode various information, such as residual coefficient information and block type information of the coding unit, prediction mode information, partition unit information, prediction unit information and transmission unit information, motion vector information, reference frame information, interpolation information for a block, filtering information, and LCU size information, which are provided by the re-arrange module 160 and the prediction module 120 and 125.

The entropy encoding module 165 may perform an entropy encoding on the coefficient values of the coding unit as an input from the re-arrangement module 160 by using an entropy encoding method, such as CABAC.

The dequantization module 140 may perform dequantization on the values quantized by the quantization module 135, and the inverse transform module 145 may perform inverse transform on the values transformed by the transform module 130. The residual values generated by the dequantization module 140 and the inverse transform module 145 may be added with the prediction unit predicted through a motion estimation module, a motion compensation module and an intra prediction module included in the prediction module 120 and 125, thereby generating a restored block.

A filtering module 150 may include at least one of a deblocking filter, an offset correcting module, and an ALF (Adaptive Loop Filter).

A deblocking filter may remove a block distortion that is occurred due to a block boundary in the restored (or reconstructed) picture. Whether to apply the deblocking filter to a current block may be determined by a pixel included in several rows or columns included in blocks. In case that the deblocking filter is applied to the block, either a strong filter or a weak filter may be applied according to a necessary strength of the deblocking filtering. Further, in case that the deblocking filter is applied to the block, a horizontal direction filtering and a vertical direction filtering may be performed in parallel.

An offset correcting module may correct an offset between an original picture and a picture applied with deblocking in a pixel unit (or a per-pixel basis). In order to perform the offset correction on a specific picture, pixels included in the picture are partitioned into a predetermined number of areas, one of which is then determined to perform an offset, and a method of applying an offset to the corresponding area or a method of applying an offset considering edge information of each pixel may be used.

An ALF (Adaptive Loop Filter) may perform a filtering based on a value obtained by comparing a filtered reconstructed (or restored) picture with the original picture. Pixels included in a picture are partitioned into predetermined groups, and then, one filter to be applied to a corresponding group is determined to thereby perform filtering on each group in a discriminating way. With respect to information on whether to apply the ALF, a luma signal may be transmitted for each coding unit, and the size and coefficient of the ALF to be applied may vary for each block. The ALF may have various shapes, and the number of coefficients included in the filter may vary correspondingly. Filtering-related information of such ALF (e.g., filter coefficient information, ALF On/Off information, or filter shape information) may be transmitted, included in a predetermined parameter set of the bitstream.

The memory 155 may store the reconstructed block or picture generated through the filtering module 150, and the stored reconstructed block or picture may be provided to the prediction module 120 and 125 when inter prediction is performed.

Figure 2:
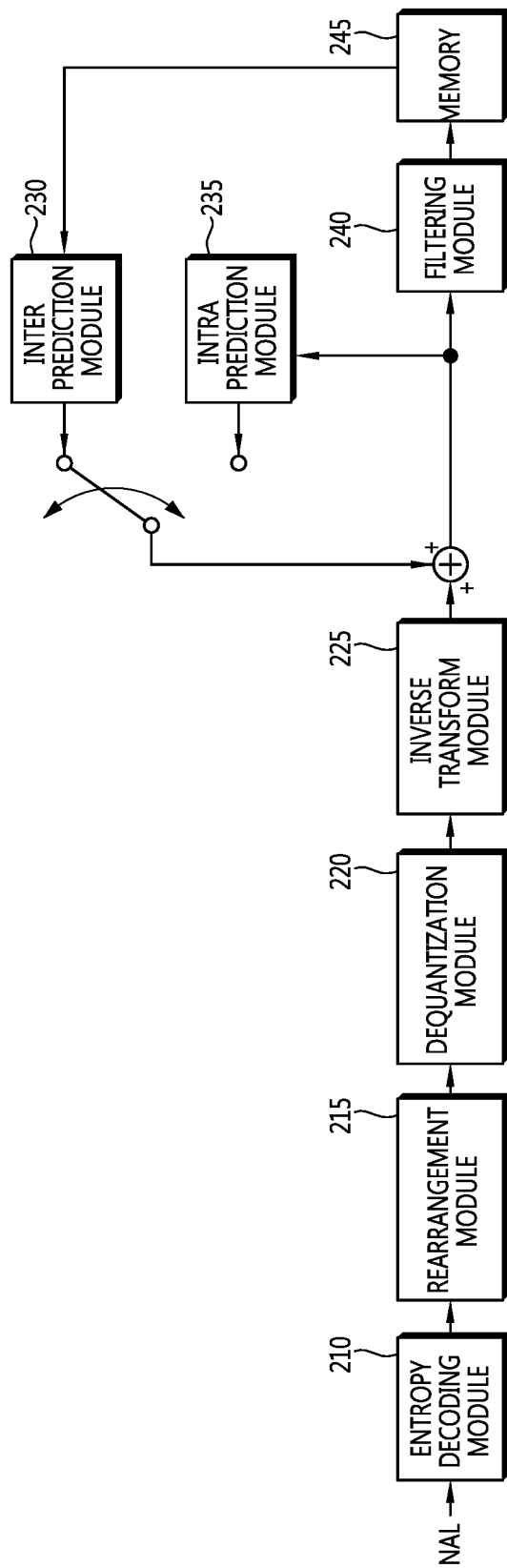
FIG. 2 is a block diagram illustrating a video decoder according to another embodiment of the present invention.

FIG. 2 is a block diagram illustrating a video decoder according to another embodiment of the present invention.

Referring to FIG. 2, the video decoder may include an entropy decoding module 210, a re-arrangement module 215, a dequantization module 220, an inverse transform module 225, prediction module 230 and 235, a filtering module 240, and a memory 245.

In case a video bitstream is input from the video encoder, the input bitstream may be decoded in a procedure opposite to that of the video encoder.

The entropy decoding module 210 may perform an entropy decoding in a procedure opposite to that of the entropy encoding performed in the entropy encoding module of the video encoder. Of the pieces of information decoded in the entropy decoding module 210, information used to derive a prediction block, such as LCU size information or block size information, is provided to the prediction module 230 and 235, and the residual values derived through entropy decoding in the entropy decoding module may be input to the re-arrangement module 215.

The entropy decoding module 210 may decode information relating to an intra prediction and an inter prediction performed in the encoder. As described above, in case there is a predetermined limitation when the video encoder performs the intra prediction and the inter prediction, the entropy decoding is performed based on such limitation to thereby receiving information relating to the intra prediction and inter prediction for the current block.

The re-arrangement module 215 may perform a re-arrangement based on a method by the encoder for re-arranging a bitstream which is entropy decoded in the entropy decoding module 210. Such re-arrangement may be performed by restoring coefficients represented in the form of one-dimensional vectors to 2D block shape of coefficients.

The dequantization module 220 may perform a dequantization based on the block of re-arranged coefficients and quantization parameters provided from the encoder.

The inverse transform module 225 may perform an inverse DCT and an inverse DST, with respect to the DCT and DST which are performed by the transform module, on a result of the quantization performed in the video encoder. The inverse transform may be performed in basis of a transmission unit determined at the video encoder. The transforming module of the video encoder may selectively perform DCT and DST depending on a plurality of information, such as a prediction method, a size of a current block and a prediction direction, and the inverse transform module 225 of the video decoder may perform an inverse transform based on the transformed information performed by the transform module of the video encoder.

The prediction module 230 and 235 may generate a prediction block based on the previously decoded block or the previously decoded picture information as provided from the memory 245 and the prediction block generation-related information provided from the entropy decoding module 210.

The prediction module 230 and 235 may include a prediction unit determining module, an inter prediction module and an intra prediction module. The prediction unit determining module may receive various information including prediction mode information of an intra prediction method, motion prediction-related information of an inter prediction method, and prediction unit information, and the various information is input from the entropy decoding module. The prediction unit determining module may separate a prediction unit from a current coding unit, and may determine whether an intra prediction is being performed or an inter prediction is being performed on the prediction unit. The inter prediction module may perform an inter prediction on the current prediction unit according to information included in at least one of pictures among pictures prior to a current picture or pictures after the current picture. The inter prediction module may perform the inter prediction on the current prediction unit by using information necessary for inter prediction of the current prediction unit provided from the video decoder.

It may be determined which one of a skip mode, a merge mode, and an AMVP mode is a method of motion prediction for a prediction unit included in a corresponding coding unit, based on the coding unit, in order to perform inter prediction.

According to an embodiment of the present invention, the inter prediction module may determine whether a prediction target block adjoins with a boundary of an LCU (Largest Coding Unit), and may determine whether a first collocated block is available according to the determination of whether the prediction target block adjoins with the boundary of the LCU. For example, if it is determined that the first collocated block is not available, a second collocated block may be determined as a collocated block to derive a temporal motion prediction vector, or if the first collocated block is not available, the position of the first collocated block may be changed such that the position-changed first collocated block may be determined as a collocated block to derive a temporal motion prediction vector. Further, the inter prediction module may include a predicting module that determines a reference picture index of a collocated block of the prediction target block and determines a motion prediction vector of the collocated block. The collocated block may be adaptively determined according to a location of the prediction target block in the LCU (Largest Coding Unit). Hereinafter, an operation of a prediction module according to the present invention is described in detail.

The intra prediction module may generate a prediction block based on information of pixels in a current picture. In case the prediction unit is the one which the intra prediction is applied to, the intra prediction may be performed based on intra prediction mode information of the prediction unit provided from the video encoder. The intra prediction module may include an MDIS filter, a reference pixel interpolating module, and a DC filter. The MDIS filter performs a filtering on the reference pixels of the current block. For the MDIS filter, it may be determined whether to apply the filter according to the prediction mode of the current prediction unit. The filtering on the reference pixels of the current block may be performed using MDIS filter information and prediction mode of the prediction unit provided from the video encoder. In case the prediction mode of the current block is a mode in which filtering is not performed, the MDIS filter may not apply.

In case that the prediction mode of the prediction unit is a prediction mode in which the intra prediction is performed based on the pixel values obtained by interpolating the reference pixel, the reference pixel with a unit less than an integer pixel may be derived by interpolating the reference pixels. In case that the prediction mode of the current prediction unit is a prediction mode in which the prediction block is generated without interpolating the reference pixels, the reference pixel may not be subjected to interpolation. The DC filter may generate a prediction block through the filtering, if the prediction mode of the current block is a DC mode.

The reconstructed block or picture may be provided to the filtering module 240. The filtering module 240 may include a deblocking filter, an offset correcting module, and an ALF.

Information on whether the corresponding block or picture has been applied with the deblocking filter may be provided from a video (or image) encoder. If the deblocking filter has been applied, information on whether the applied deblocking filter is a strong filter or a weak filter may be provided from the video encoder. The deblocking filter of the video decoder may receive deblocking filter-related information from the video encoder, and the deblocking filtering may be performed on the corresponding block in the video decoder. Like the video encoder, the video decoder may first perform a vertical deblocking filtering and a horizontal deblocking filtering. An overlapping portion(s) may be subjected to at least one of the vertical deblocking and horizontal deblocking. In the region where the vertical deblocking filtering and the horizontal deblocking filtering overlap each other, either of the vertical deblocking filtering or the horizontal deblocking filtering, which did not perform previously may be performed for this region. Such deblocking filtering process enables a parallel processing of the deblocking filtering.

An offset correcting module may perform an offset correction on the reconstructed picture based on a type of the offset correction applied to the picture in an encoding process and information on offset value applied in the encoding process.

An ALF may perform a filtering according to a comparison between the reconstructed picture after the filtering and the original picture. The ALF may be performed on a coding unit based on the information on whether the ALF is applied and ALF coefficient information, which are provided from the encoder. Such ALF information may be provided by included in a specific parameter set.

The memory 245 may store a reconstructed picture or a reconstructed block in order to use this as a reference picture or a reference block, and may provide the reconstructed picture to an display module.

As described above, even if a term of 'coding unit' is used in the embodiment of the present invention for convenience of description, the coding unit may be also used as a unit for decoding. Hereinafter, a the prediction method described below in connection with FIGS. 3 to 11 according to an embodiment of the present invention may be performed in a component, such as a predicting module as shown in FIGS. 1 and 2.

Figure 3:
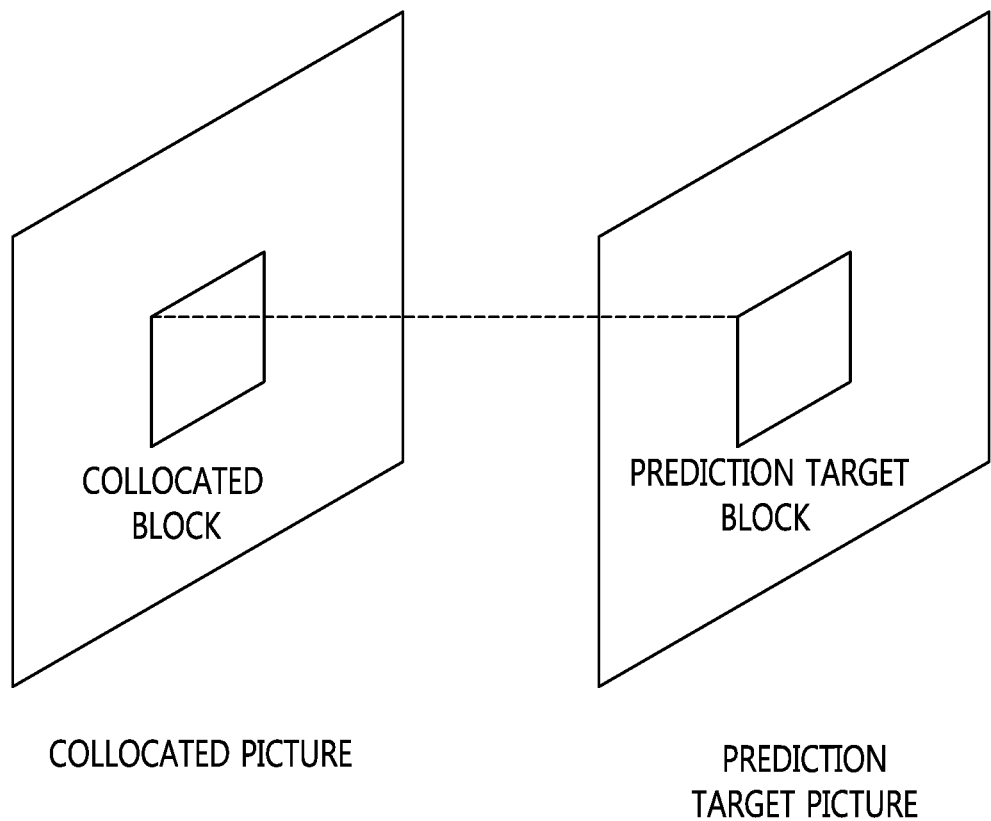
FIG. 3 is a conceptual view illustrating a method of deriving a temporal prediction motion vector according to an embodiment of the present invention.

FIG. 3 is a conceptual view illustrating a method of deriving a temporal prediction motion vector according to an embodiment of the present invention.

Referring to FIG. 3, the temporal prediction motion vector may be derived based on a motion vector value of a collocated block (colPu) in a collocated picture (colPic).

The collocated picture is a picture including a collocated block for deriving temporal prediction motion related information upon performing the inter prediction method, such as a merge or AMVP. The collocated block may be defined as a block included in a collocated picture, and the collocated block is derived based on location information of a prediction target block and has a temporally different phase from the prediction target block.

There may be a plurality of collocated blocks for one prediction target block. The motion related information of the collocated block included in the collocated picture may be stored as one representative value with respect to a predetermined unit. For example, with respect to a unit of 16×16 block size, motion prediction related information (motion vector, reference picture, etc.) may be determined and stored as one representative value in a 16×16 block unit.

Figure 4:
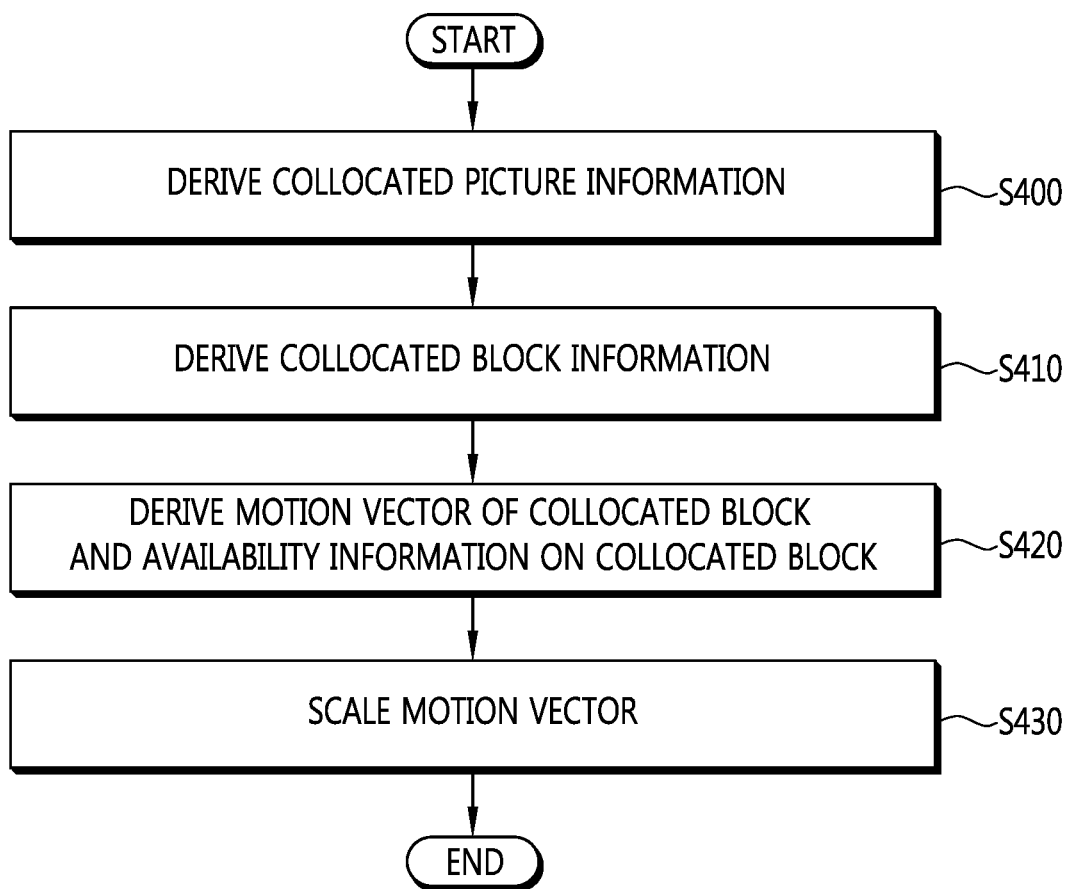
FIG. 4 is a flowchart illustrating a method of deriving a temporal prediction motion vector according to an embodiment of the present invention.

FIG. 4 is a flowchart illustrating a method of deriving a temporal prediction motion vector according to an embodiment of the present invention.

Hereinafter, the method of deriving a temporal prediction motion vector, which is to be described below, may be used in an inter prediction method such as merge mode or AMVP mode. The method of deriving the temporal prediction motion vector may be a method of deriving a temporal candidate block (collocated block) for performing merge mode, a method of deriving a temporal candidate block (collocated block) for performing AMVP mode, and a method of deriving a temporal prediction motion vector.

Hereinafter, in an embodiment of the present invention, the collocated block may be defined and used as a term indicating a temporal candidate block used in the merge mode and AMVP mode.

Referring to FIG. 4, collocated picture information is derived (step S400).

Location information of a prediction target block, size information of the prediction target block, and reference picture index information of the prediction target block may be used to derive collocated picture information, collocated block information and temporal prediction motion vector.

According to an embodiment of the present invention, the collocated picture information may be derived based on slice type information (slice_type), reference picture list information (collocated_from_l0_flag), and reference picture index information (collocated_ref_idx). Using the reference picture list information (collocated_from_l0_flag), if the reference picture list information (collocated_from_l0_flag) indicates 1, it represents that the collocated picture is included in a first reference picture list (List 0), and if the reference picture list information (collocated_from_l0_flag) indicates 0, it represents that the collocated picture is included in a second reference picture list (List 1).

For example, in case the slice_type is slice B and a value of the reference picture list information (collocated_from_l0_flag) is 0, the collocated picture may be determined as a picture included in the second reference picture list, and in case the slice type is slice B and a value of the reference picture list information (collocated_from_l0_flag) is 1 or in case the slice type is slice P, the collocated picture may be determined as a picture included in the first reference picture list.

In the case of an inter prediction method using a merge mode, if a predetermined condition is met, reference picture index information of a neighboring block at a specific position may be determined as information for collocated picture, and if the predetermined condition is not met, a previous picture of a current picture may be determined as collocated picture.

Information for collocated block is derived (step S410).

The information for collocated block may be differently derived depending on whether part (or portion) of a prediction target block adjoins with a boundary of an LCU (Largest Coding Unit). Hereinafter, a method of determining a collocated block depending on the location of a prediction target block and the boundary of an LCU is described with reference to FIGS. 5 to 9.

Figure 5:
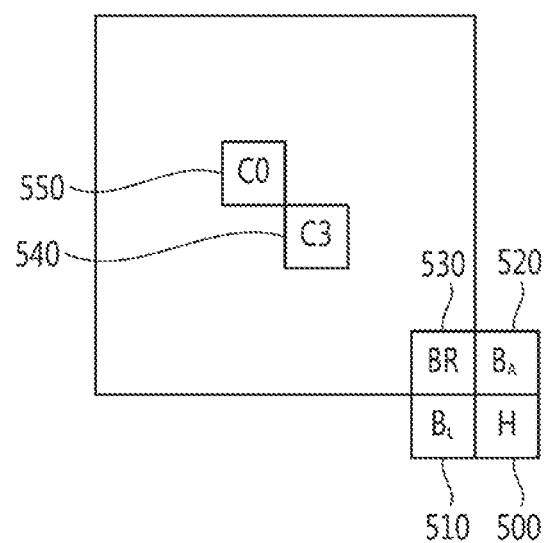
FIG. 5 is a conceptual view illustrating a position of a collocated block to derive a temporal motion vector according to an embodiment of the present invention.

FIG. 5 is a conceptual view illustrating a location of a collocated block to derive a temporal motion vector according to an embodiment of the present invention.

Referring to FIG. 5, blocks at various positions with respect to a prediction target block may be used as collocated blocks to derive a temporal motion vector. The collocated blocks that may be used to derive the temporal motion vector may be classified depending on the locations as follows.

In case a point located at a top-left of a prediction target block is at (xP, yP), the width of the prediction target block is nPSW, and the height of the prediction target block is nPSH, a first collocated block 500 may be a block including a point (xP+nPSW, yP+nPSH) in the collocated picture, a second collocated block 510 may be a block including a point (xP+nPSW−MinPuSize, yP+nPSH) in the collocated picture, a third collocated block 520 may be a block including a point (xP+nPSW, yP+nPSH−MinPuSize) in the collocated picture, a fourth collocated block 530 may be a block including a point (xP+nPSW−1, yP+nPSH−1) in the collocated picture, a fifth collocated block 540 may be a block including a point (xP+(nPSW>>1), yP+(nPSH>>1)) in the collocated picture, and a sixth collocated block 550 may be a block including a point (xP+(nPSW>>1)−1, yP+(nPSH>>1)−1) in the collocated picture.

The collocated block may be adaptively determined according to a position of a current prediction unit located within in the LCU. A positional relationship between a prediction target block and a boundary of the LCU may be categorized in the following cases: 1) where a lower end and a right side of the prediction target block do not adjoin with the LCU boundary, 2) where only the lower end of the prediction target block adjoins with the LCU boundary, 3) where both the right side and the lower end of the prediction target block adjoin with the LCU boundary, and 4) where only the right side of the prediction target block adjoins with the LCU boundary.

According to an embodiment of the present invention, the collocated block may be adaptively determined in a different way depending on the location of the prediction target block in the LCU.

1) In case that the lower end and right side of the prediction target block do not adjoin with the LCU boundary, the first collocated block and the fifth collocated block may be sequentially used as a collocated block with an availability check in order to derive a temporal motion vector.

2) In case that only the lower end of the prediction target block adjoins with the LCU boundary, the third collocated block and the fifth collocated block may be sequentially used as a collocated block with the availability check in order to derive a temporal motion vector.

3) In case that both the right side and lower end of the prediction target block adjoin with the LCU boundary, the fourth collocated block and the fifth collocated block may be sequentially used as a collocated block with the availability check in order to derive a temporal motion vector.

4) In case that only the right side of the prediction target block adjoins with the LCU boundary, the second collocated block and the fifth collocated block may be sequentially used as a collocated block with the availability check in order to derive a temporal motion vector.

That is, according to an embodiment of the present invention, depending on the location of the current block in the LCU, a temporal candidate block may be adaptively determined. The positions of pixels to specify a temporal candidate block for a case when the lower boundary of the current block adjoins with the LCU boundary may be different from the positions of pixels to specify a temporal candidate block for a case when the lower boundary of the current block does not adjoin with the LCU boundary. And, the positions of pixels to specify a temporal candidate block for a case when the lower boundary of the current block adjoins with the LCU boundary may be different from the positions of pixels to specify a temporal candidate block for a case when only the right boundary of the current block adjoins with the LCU boundary.

According to another embodiment of the present invention, a method may be used, in which a collocated block may be determined (or selected) adaptively and differently depending on the position of the prediction target block in the LCU such that the collocated block and the prediction target block are located within same LCU, or the collocated block may not be used if the collocated block and the target prediction block are not located within same LCU.

Figure 6:
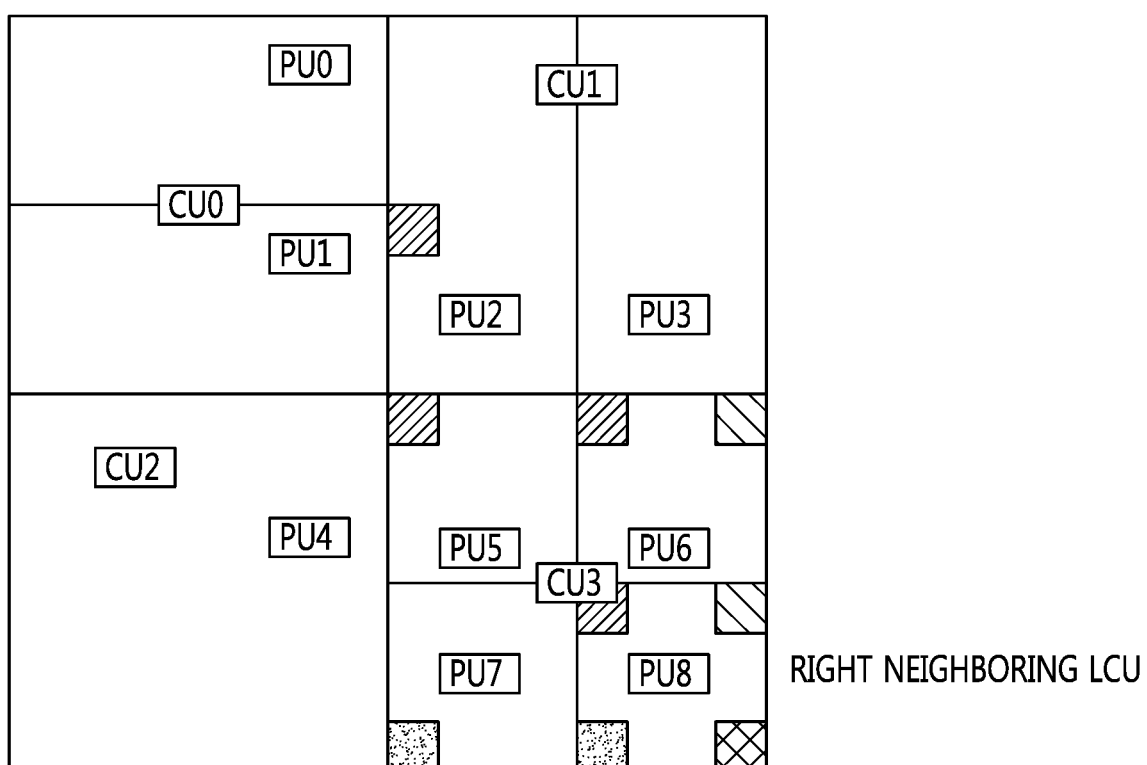
FIG. 6 is a conceptual view illustrating a method of determining a collocated block to derive a motion prediction vector according to an embodiment of the present invention.

FIG. 6 is a conceptual view illustrating a method of determining a collocated block to derive a motion prediction vector according to an embodiment of the present invention.

Referring to FIG. 6, the positions of collocated blocks of a plurality of prediction units included in one LCU may be known.

For the cases of PU0, PU1, PU2, and PU5, the prediction units are prediction units inside of the LCU, and the first collocated block may be firstly used as a collocated lock to derive a temporal motion vector.

For the cases of PU4 and PU7, the boundaries of the prediction units adjoin with only the lower boundary of the LCU, and the third collocated block may be firstly used as collocated block to derive a temporal motion vector.

For the case of PU8, the boundary of the prediction unit adjoins with both the lower boundary and the right boundary of the LCU, and the fourth collocated block may be firstly used as a collocated block to derive a temporal motion vector.

For the cases of PU3 and PU6, the boundaries of the prediction units adjoin with only the right boundary of the LCU, and the second collocated block may be firstly used as a collocated block to derive a temporal motion vector.

That is, as described above, a temporal candidate block is adaptively determined depending on the location of the current block in the LCU, and the positions of pixels to specify a temporal candidate block for cases when the lower boundary of the current block adjoins with the LCU boundary (cases of PU4, PU7 and PU8) and for cases when the lower boundary of the current block does not adjoin with the LCU boundary (cases of PU0, PU1, PU2, PU3, PU5, and PU6) are different from each other. Further, the positions of pixels to specify a temporal candidate block may be different for cases when the lower boundary of the current block adjoins with the LCU boundary (cases of PU4, PU7, and PU8) and for cases when only the right boundary of the current block adjoins with the LCU boundary (cases of PU3 and PU6).

According to another embodiment of the present invention, as long as a collocated block is located within same LCU together with the prediction target block, the collocated block is adaptively and differently determined depending on the location of the prediction target block in the LCU. If a specific collocated block is not located within same LCU together with the prediction target block, such specific collocated block may be not available. For example, if the lower boundary of a prediction block adjoins with the lower boundary of the LCU like PU4, PU7, and PU8, the first collocated block may be marked (or indicated) as unavailable, and the fifth collocated block may be used instead as a collocated block to derive a temporal prediction vector.

As such, as a method of deriving a collocated block, a method may be used that, categorizing characteristics of a prediction target block as described above depending on the location of the prediction target block and LCU boundary, selects a block to be used as a collocated block depending on the categorized location of the prediction target block. Preferably, it is assumed that the first collocated block and the fifth collocated block may be sequentially used as a collocated block to derive a temporal motion vector. After checking an availability of the first collocated block (for example, whether the lower boundary of the prediction target block adjoins with the LCU), a collocated block other than the first collocated block may be determined as a collocated block to derive a temporal motion vector. For example, if the first collocated block is determined as unavailable through steps of determining whether the prediction target block adjoins with the boundary of the LCU (Largest Coding Unit), the collocated block to derive a temporal motion vector may be changed to other collocated block (e.g., third collocated block), or the fifth collocated block may be used directly without using the first collocated block.

Specifically, the above method may be performed through the following steps:

1) Step of determining whether the boundary of the prediction target block adjoins with the boundary of the LCU (Largest Coding Unit), 2) Step of determining whether the first collocated block is available depending on whether the boundary of the prediction target block adjoins with the LCU boundary. Specifically in step 2), when the lower boundary of the prediction target block adjoins with the LCU boundary, it may be determined that the first collocated block is not available, 3) Step of determining a collocated block other than the first collocated block as a collocated block to derive a temporal prediction motion vector when the first collocated block is not available. Specifically, in step 3), for a case that the lower boundary of the prediction target block adjoins with the LCU boundary and for a case that the right boundary of the prediction target block adjoins with the LCU boundary, different collocated blocks for each different case may be determined as collocated blocks to derive a temporal prediction motion vector, 4) Step of determining the first collocated block as a collocated block to derive a temporal prediction motion vector if the first collocated block is available, and determining an availability of the fifth collocated block if the first collocated block is not available.

The above steps may be optional steps, and the sequential relationship of the steps or the method of the determination may be changed without departing from the gist of the present invention.

Figure 7:
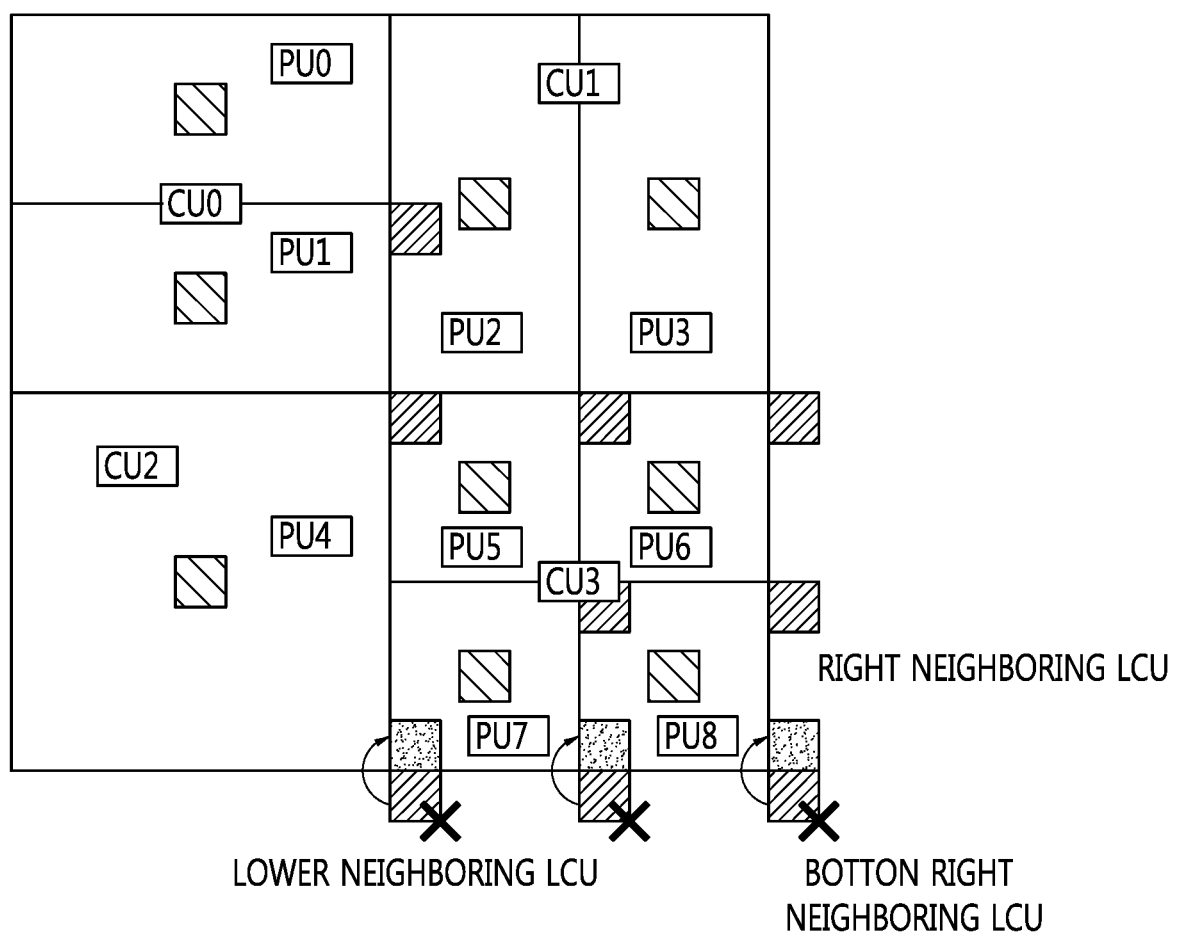
FIG. 7 is a conceptual view illustrating a case where a prediction target block adjoins with a lower boundary of an LCU according to an embodiment of the present invention.

FIG. 7 is a conceptual view illustrating a case where a prediction target block adjoins with a lower boundary of an LCU according to an embodiment of the present invention.

Referring to FIG. 7, a case is shown that the location of the collocated block is changed when the prediction target block (PU, PU7, or PU8) is located at the lower boundary of the LCU. In case the prediction target block (PU4, PU7, or PU8) is located at the lower boundary of the LCU, the location of the collocated block may be set so that the motion prediction-related information may be derived even without searching an LCU positioned under a current LCU among LCUs. For example, a temporal prediction motion vector may be derived by using the third collocated block rather than the first collocated block of the prediction target block. 1) in case that only the right boundary of the LCU is adjoined, depending on availability, the first collocated block and the fifth collocated block are sequentially determined as a collocated block to derive a temporal prediction motion vector, 2) in case that the lower boundary of the LCU is adjoined, depending on availability, the third collocated block and the fifth collocated block may be sequentially determined as a collocated block to derive a temporal prediction motion vector. That is, according to an embodiment of the present invention, the positions of pixels to specify a temporal candidate block may be different for a case when the lower boundary of the current block adjoins with the LCU boundary and for a case when the lower boundary of the current block does not adjoin with the LCU boundary.

Referring back to FIG. 4, based on the collocated block determined through the method described above in connection with FIGS. 5 to 7, a collocated block motion prediction vector (mvLXCol) and collocated block availability information (availableFlagLXCol) are derived (step S420).

The collocated block availability information (availableFlagLXCol) and motion vector (mvLXCol) of the collocated block, which is to be used for inter prediction of the prediction target block based on the collocated block information determined through the processes shown in FIGS. 5 to 7, may be derived by the following method:

1) If the collocated block (colPu) is encoded based on an intra prediction mode, if the collocated block (colPu) is not available, if the collocated picture (colPic) is not available for predicting a temporal prediction motion vector, or if inter prediction is performed without using a temporal prediction motion vector, the collocated block motion vector (mvLXCol) and the collocated block availability information (availableFlagLXCol) may be set as 0.

2) Other than the case 1), the collocated block motion vector information (mvLXCol) and the collocated block availability information (availableFlagLXCol) may be derived through a flag (PredFlagL0) and a flag (PredFlagL1), where the flag (PredFlagL0) indicates whether L0 list is used or not, and the flag (PredFlagL1) indicates whether L1 list is used or not.

First, if it is determined that the inter prediction has been performed on the collocated block without using list L0 (the flag (PredFlagL0) is equal to 0), motion prediction-related information of the collocated block, such as mvCol information, refIdxCol information, and listCol information, may be set as L1 and MvL1[xPCol][yPCol], RefIdxL1[xPCol]

[yPCol], which are motion prediction-related information of the collocated block derived by using list L1, and the collocated block availability information (availableFlagLXCol) may be set as 1.

In other cases, if it is determined that inter prediction has been performed on collocated block using list L0 (the flag (PredFlagL0) is equal to 1), motion prediction-related information of the collocated block, such as mvCol information, refIdxCol information, and listCol information, may be set separately for a case where PredFlagL1 is 0 and for a case where PredFlagL1 is 1, and the collocated block availability information (availableFlagLXCol) may be set as 1.

The derived mvLXCol is scaled (step S430).

To use the mvLXCol derived through step S420 as a temporal prediction motion vector of the prediction target block, a derived mvLXCol value may be scaled based on distance information relating to a distance between the collocated picture including the collocated block and the collocated block reference picture referred by the collocated block and a distance between the picture including the prediction target block and a reference picture referred by the prediction target block. After the derived mvLXCol value is scaled, the temporal prediction motion vector can be derived.

Hereinafter, according to an embodiment of the present invention, a method of performing an inter prediction, such as merge and AMVP, is described.

Figure 8:
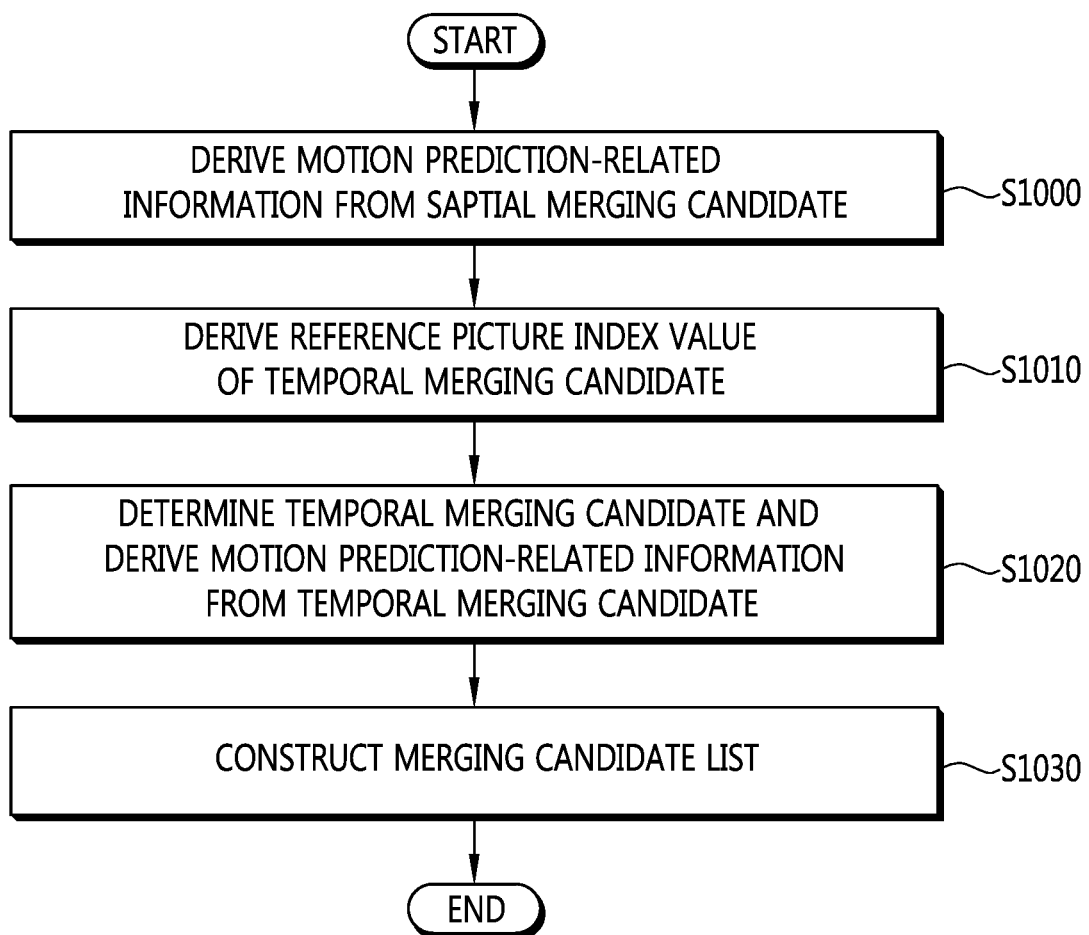
FIG. 8 is a flowchart illustrating an inter prediction method using a merge mode according to an embodiment of the present invention.

FIG. 8 is a flowchart illustrating an inter prediction method using a merge mode according to an embodiment of the present invention.

Referring to FIG. 8, motion prediction-related information may be derived from a spatial merging candidate (step S1000).

The spatial merging candidate may be derived from neighboring prediction units of a prediction target block. To derive the spatial merging candidate, information on the width and height of the prediction unit, MER (Motion Estimation Region) information, singleMCLFlag information, and partition position information may be received. Based on such input information, availability information (availableFlagN) according to the position of the spatial merging candidate, reference picture information (refIdxL0, refIdxL1), list utilization information (predFlagL0N, redFlagL1N), and motion vector information (mvL0N, mvL1N) may be derived. A plurality of blocks neighboring to the prediction target block may be spatial merging candidates.

Figure 9:
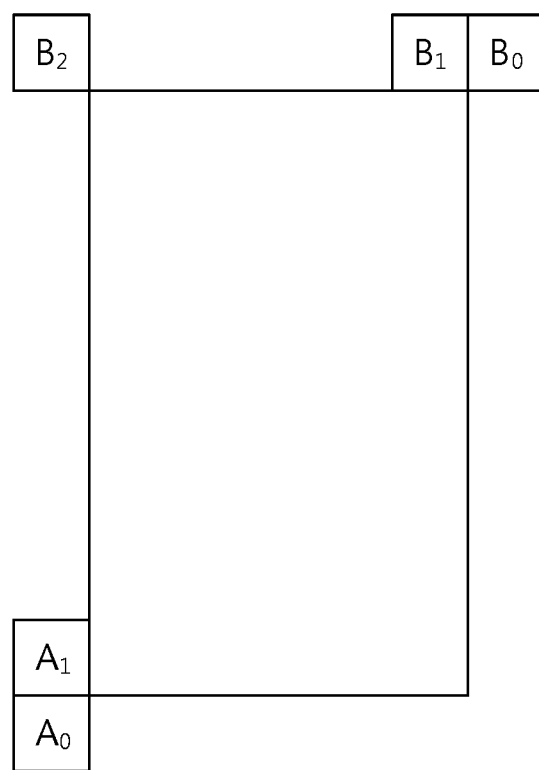
FIG. 9 is a conceptual view illustrating locations of spatial merging candidates according to an embodiment of the present invention.

FIG. 9 is a conceptual view illustrating positions of spatial merging candidates according to an embodiment of the present invention.

Referring to FIG. 9, in case that a location of a point at a top-left of the prediction target block is (xP, yP), a width of the prediction target block is nPSW, and a height of the prediction target block is nPSH, the spatial merging candidates may be a block A0 including the point (xP−1, yP+nPSH), a block A1 including the point (xP−1, yP+nPSH−MinPuSize), a block B0 including the point (xP+nPSW, yP−1), a block B1 including the point (xP+nPSW−MinPuSize, yP−1), and a block B2 including the point (xP−MinPuSize, yP−1).

Referring back to FIG. 8, a reference picture index value of the temporal merging candidate is derived (step S1010).

The reference picture index value of the temporal merging candidate, as an index value of a collocated picture including the temporal merging candidate (collocated block), may be derived through specific conditions as follows. The following conditions are arbitrary and may vary. For example, in case that a location of point at a top-left of the prediction target block is (xP, yP), the width of the prediction target block is nPSW, and the height of the prediction target block is nPSH, when 1) there exists a neighboring prediction unit of the prediction target block corresponding to position (xP−1, yP+nPSH−1) (hereinafter, referred to as a reference picture index derivation neighboring prediction unit), 2) the partition index value of the reference picture index derivation neighboring prediction unit is 0, 3) the reference picture index derivation neighboring prediction unit is not a block on which prediction performed using an intra prediction mode, and 4) the prediction target block and the reference picture index derivation neighboring prediction block do not belong to the same MER (Motion Estimation Region), the reference picture index value of the temporal merging candidate may be determined as the same value as the reference picture index value of the reference picture index derivation neighboring prediction unit. In the case of failing to satisfy these conditions, the reference picture index value of the temporal merging candidate may be set as 0.

The temporal merging candidate block (collocated block) is determined, and motion prediction-related information is derived from the collocated block (step S1020).

According to an embodiment of the present invention, the temporal merging candidate block (collocated block) may be adaptively determined depending on the location of the prediction target block in the LCU so that the collocated block is included in the same LCU together with the prediction target block.

1) In case that the lower end and the right side of the prediction target block do not adjoin with the LCU boundary, determining an availability, the first collocated block and the fifth collocated block may be sequentially used as a collocated block to derive a temporal motion vector.

2) In case that only the lower end of the prediction target block adjoins with the LCU boundary, determining an availability, the third collocated block and the fifth collocated block may be sequentially used as a collocated block to derive a temporal motion vector.

3) In case that both the right side and the lower end of the prediction target block adjoin with the LCU boundary, determining an availability, and the fourth collocated block and the fifth collocated block may be sequentially used as collocated blocks to induce a temporal motion vector.

4) In case only the right side of the prediction target block is adjacent to the LCU boundary, availability is determined, and the second collocated block and the fifth collocated block may be sequentially used as collocated blocks to induce a temporal motion vector.

According to an embodiment of the present invention, a method may be used that enables a collocated block to be adaptively and differently determined depending on the position of the prediction target block in the LCU to be present at a position included in one LCU together with the prediction target block, or the collocated block not included in one LCU together with the prediction target block may not be used.

As described above, as a method of producing a collocated block, a method may be used of separating characteristics of a prediction target block as described above depending on the position of the prediction target block and LCU boundary and determining a block to be immediately used as a collocated block depending on the position of the separated prediction target block. However, the first collocated block and the fifth collocated block may be first assumed to be sequentially used as collocated blocks to induce a temporal motion vector, whether the first collocated block is available (for example, whether the lower boundary of the prediction target block is adjacent to the LCU) is determined, and then, a collocated block other than the first collocated block may be determined as a collocated block to induce a temporal motion vector.

A merge candidate list is configured (step S1030).

The merging candidate list may be constructed to include at least one of spatial merging candidates and a temporal merging candidate. The spatial merging candidates and temporal merging candidate included in the merging candidate list may be arranged with a predetermined priority.

The merging candidate list may be constructed to have a fixed number of merging candidates, and if the number of merging candidates is less than the fixed number, the motion prediction-related information owned by the merging candidates is combined to generate merging candidates or zero vectors are generated as merging candidates, thereby generating the merging candidate list.

FIG. 10 is a flowchart illustrating an inter prediction method using AMVP according to an embodiment of the present invention.

Referring to FIG. 10, motion prediction-related information is derived from spatial AMVP candidate blocks (step S1200).

To derive the reference picture index information and a prediction motion vector of the prediction target block, the spatial AMVP candidate block(s) may be derived from neighboring prediction blocks of the prediction target block.

Referring back to FIG. 9, one of block A0 and block A1 may be used as a first spatial AMVP candidate block, and one of block B0, block B1, and block B2 may be used as a second spatial AMVP candidate block, thereby deriving the spatial AMVP candidate blocks.

Motion prediction-related information is derived from a temporal AMVP candidate block (step S1210).

According to an embodiment of the present invention, the collocated block may be adaptively determined depending on the location of the prediction target block in the LCU so that the collocated block is included in same LCU together with the prediction target block.

1) In case that the lower end and the right side of the prediction target block do not adjoin with the LCU boundary, the first collocated block and the fifth collocated block may be sequentially used as a collocated block to derive a temporal motion vector with an availability check.

2) In case that only the lower end of the prediction target block adjoins with the LCU boundary, the third collocated block and the fifth collocated block may be sequentially used as a collocated block to derive a temporal motion vector with an availability check.

3) In case that both the right side and the lower end of the prediction target block adjoin with the LCU boundary, the fourth collocated block and the fifth collocated block may be sequentially used as a collocated block to derive a temporal motion vector with an availability check.

4) In case that only the right side of the prediction target block adjoins with the LCU boundary, the second collocated block and the fifth collocated block may be sequentially used as a collocated block to derive a temporal motion vector with an availability check.

According to an embodiment of the present invention, a method that the collocated block not included in same LCU together with the prediction target block may not be used, as well as a method that a collocated block is adaptively determined depending on the location of the prediction target block in the LCU to be present at a location included in same LCU together with the prediction target block, may be used.

In the step S1200 of deriving the spatial AMVP candidate blocks, when the first spatial AMVP candidate block and the second spatial AMVP candidate block are determined as available, and the derived motion prediction vector values are not the same, the step S1210 of deriving a temporal prediction motion vector may not be performed.

An AMVP candidate list is constructed (step S1220).

The AMVP candidate list is constructed by using the motion prediction-related information derived through at least one of steps S1200 and S1210. In case the same motion prediction-related information exists in the constructed AMVP candidate list, one value among the same motion prediction-related information may be used as an AMVP candidate value. The motion prediction-related information included in the AMVP candidate list may include a fixed number of candidate values only.

Although the embodiments of the present invention have been described thus far, it may be understood by those skilled in the art to which the present invention pertains that various modifications and variations may be made to the present invention without departing from the spirit and scope of the present invention.

The invention claimed is:

1. A method of decoding a video signal with a decoding apparatus, comprising:
   deriving inverse-quantized residual coefficients by inverse-quantizing residual coefficients relating to a current block;
   deriving residual samples by performing an inverse-transform for the inverse-quantized residual coefficients of the current block;
   obtaining prediction samples of the current block by performing inter prediction or intra prediction;
   reconstructing the current block by using the residual samples and the prediction samples; and
   applying a deblocking filter to the reconstructed current block,
   wherein when the prediction samples of the current block are obtained by performing inter prediction, obtaining the prediction samples of the current block comprises:
   extracting a collocated picture index relating to a collocated picture from a bitstream;
   selecting, based on the collocated picture index, the collocated picture of a current block from a reference picture list, the collocated picture comprising a temporal candidate block which is used to derive a motion vector of the current block;
   determining the temporal candidate block in the collocated picture;
   obtaining a temporal prediction motion vector by scaling a motion vector of the temporal candidate block;
   constructing a merging candidate list including a plurality of merging candidates, the plurality of merging candidates including the temporal candidate block;
   obtaining a motion vector and a reference picture index of the current block based on the merging candidate list; and
   obtaining prediction samples of the current block by using the motion vector and the reference picture index of the current block;
   wherein the residual samples are obtained by using a discrete cosine transform (DCT) or a discrete sine transform (DST), wherein either discrete cosine transform (DCT) or discrete sine transform (DST) is selectively performed based on a prediction method and size of the current block, wherein the prediction method is either an inter prediction method or an intra prediction method, and wherein when the prediction samples of the current block are obtained by performing intra prediction, the current block is one of plural prediction blocks which are obtained by partitioning a coding block, and wherein the coding block is partitioned into the plural prediction blocks only if the coding block is a smallest coding block.

2. The method of claim 1, wherein the temporal prediction motion vector is obtained by scaling the motion vector of the temporal candidate block based on both a first temporal distance and a second temporal distance, the first temporal distance being a temporal distance between a current picture including the current block and the reference picture of the current block, and the second temporal distance being a temporal distance between the collocated picture and a reference picture of the temporal candidate block.

3. The method of claim 1, wherein when the prediction samples of the current block are obtained by performing intra prediction, the method further comprises:
    obtaining reference samples of the current block based on neighboring samples adjacent to the current block; and
    applying a smoothing filter to the reference samples based on an intra prediction mode of the current block and a filter information provided from a video encoder.

4. The method of claim 3, applying the smoothing filter comprises:
    determining whether to apply the smoothing filter to the reference samples based on the intra prediction mode of the current block; and
    selecting one of a plurality of smoothing filters based on the filter information when the smoothing filter is applied to the reference samples.

5. The method of claim 1, wherein the intra prediction is performed on a transform block basis when a size of the prediction block is different from a size of the transform block.

* * * * *